June 4, 1935.  J. INDERGAND  2,003,939
ELECTRICITY METER
Filed March 16, 1934
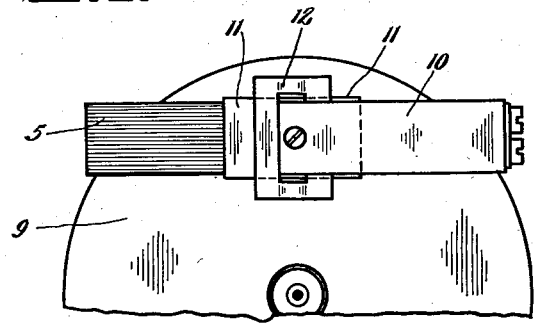
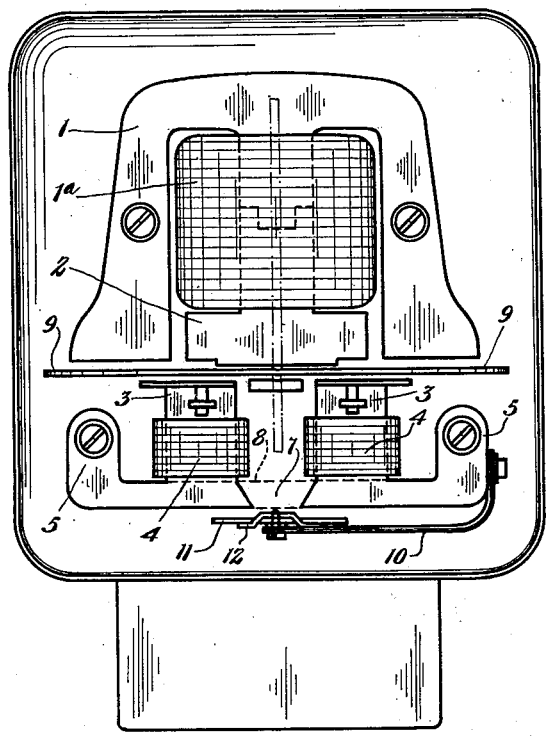
INVENTOR
Joseph Indergand
BY
John D. Morgan
ATTORNEY Patented June 4, 1935

2,003,939

UNITED STATES PATENT OFFICE 2,003,939

ELECTRICITY METER

Joseph Indergand, Baar, Switzerland, assignor to Landis & Gyr, A-G., a corporation of Switzerland Application March 16, 1934, Serial No. 715,799
In Switzerland March 18, 1933

5 Claims. (Cl. 171—264)

The present invention relates to electricity meters and more particularly to a novel and improved temperature compensated Ferraris meter.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawing, referred to herein and constituting a part hereof, illustrates one embodiment of the invention, and together with the description, serve to explain the principles of the invention.

Of the drawing:

Figure 1 is a front elevation of a watthour meter embodying the present invention; and Figure 2 is a bottom plan view of the embodiment shown in Figure 1, certain parts being omitted.

The present invention has for its object the provision of a novel and improved watthour meter of the Ferraris type having improved temperature compensating means. A further object of the invention is the provision of a meter of this type in which the temperature compensating means also act to improve the characteristic performance curve on overloads.

In accordance with the present invention an air gap is provided in the current core, and preferably between the limbs thereof, and temperature compensating means comprises a bimetal strip having one end fixed with reference to the core, and its other end movable in accordance with temperature changes. On the movable end is mounted a shaded shunting strip which serves to vary the flux across the air gap, thereby effecting the temperature compensation. By suitably proportioning the sizes and positions of the bimetal strip and shunt, the shunt may also be made to move in accordance with the meter load, thereby compensating for the usual overload error by increasing the magnetic flux across the air gap.

It will be understood that the foregoing general description and the following detailed description as well, are exemplary and explanatory of the invention but are not restrictive thereof.

Referring now in detail to the illustrative embodiment of the invention as shown in the accompanying drawing, the watthour meter comprises a voltage magnet formed by the core 1 having a central limb 2 and a voltage coil 1a, suitably supported on the meter frame, and a current magnet comprising the cores 3, current coils 4 and lateral extensions 5 by which the cores are supported on the meter frame. The current core is preferably divided into two distinct parts so as to provide an air space 7 between the parts, and these parts are braced and held rigid with respect to each other by the non-magnetic straps 8. The voltage and current magnets produce a rotating field which drives the disc 9 in the usual manner, substantially proportionately to the power consumed in the metered circuit.

As embodied, the temperature compensating means comprises a bimetal strip 10 rigidly mounted at one end on one of the current core extensions 5, and extending below the core to a point in line with the air gap 7. The bimetal member 10 is so constructed as to move upwardly towards the air gap 7 as the temperature decreases, and at its movable end is attached to and supports a plate 11 of iron or other magnetic material adjacent to which is positioned a shading ring 12.

As the temperature rises, the bimetal strip 10 moves away from the air gap 7 so that the gap is effectively increased, and the current flux as well as the meter torque is correspondingly reduced. As the temperature drops, the bimetal strip 10 moves the plate 11 and shading ring 12 towards the air gap 7 thereby effectively decreasing the gap to increase the current flux and driving torque of the meter. With such an arrangement of the parts, and including the shading ring 12, it is possible to compensate for the temperature error with an inductive load.

In case it is desired to compensate for the overload error, the bimetal strip 10 is made of the proper strength to permit an appreciable movement between the current core and the iron plate 11, due to the magnetic attraction caused by the current core 3. As the plate 11 is moved towards the air gap 7, the current flux is increased so as to compensate to a substantial degree for the current damping.

The embodiment of the invention shown and described not only renders the measuring instrument independent of temperature at a power factor of 1 and at lower power factors, but also considerably reduces the undesirable drop in the characteristic performance curve on heavy overloads.

The invention in its broader aspects is not limited to the specific mechanisms shown and described but departures may be made therefrom within the scope of the accompanying claims without departing from the principles of the invention and without sacrificing its chief advantages.

What I claim is:

1. A Ferraris meter including in combination voltage and current magnets and a metering disc to be rotated thereby, the current magnets being provided with an air gap, and temperature controlled means for varying the magnetic reluctance of the air gap comprising a plate of magnetic material positioned adjacent to said gap and temperature control means for moving said plate.

2. A Ferraris meter including in combination voltage and current magnets and a metering disc to be rotated thereby, the current magnets being provided with an air gap, a plate of magnetic material positioned adjacent to said gap and supported on a bimetal strip whereby the plate is moved with respect to said gap in accordance with temperature changes to compensate for temperature errors.

3. A Ferraris meter including in combination voltage and current magnets and a metering disc to be rotated thereby, the current magnets being provided with an air gap, a plate of magnetic material and a shading ring therefor positioned adjacent to said gap and supported on a bimetal strip whereby the plate and shading ring are moved with respect to said gap in accordance with temperature changes to compensate for temperature errors.

4. A Ferraris meter including in combination voltage and current magnets and a metering disc to be rotated thereby, the current magnets being provided with an air gap, a plate of magnetic material, a shading ring therefor positioned adjacent to said gap and a bimetal strip attached to said plate and ring for supporting them, the plate and ring being movable in accordance with temperature and load to compensate for temperature and overload errors.

5. A Ferraris meter including in combination a metering disc, a voltage magnet and independent current magnets having separate cores, the voltage and current magnets being adapted to rotate the metering disc, means for mounting the current magnets closely adjacent to each other with an air gap between them positioned away from the disc, a shunt for the air gap, and temperature control means for variably positioning the shunt with respect to the air gap to effect temperature compensation of the meter.

JOSEPH INDERGAND.